Figure 1:
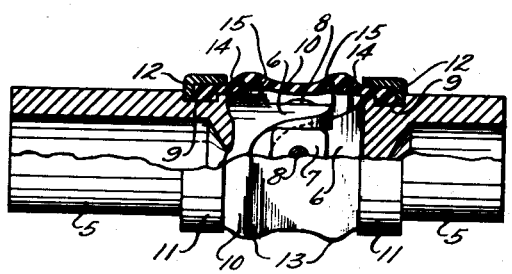

Aug. 11, 1953  G. B. STILLWAGON, JR  2,648,208
FLEXIBLE COVER FOR UNIVERSAL JOINTS
Filed May 31, 1947

INVENTOR.
GEORGE B. STILLWAGON Jr.
BY
ATTORNEY

Patented Aug. 11, 1953

2,648,208

UNITED STATES PATENT OFFICE 2,648,208

FLEXIBLE COVER FOR UNIVERSAL JOINTS

George B. Stillwagon, Jr., Dayton, Ohio, assignor of one-half to Kenneth G. Fraser, Dayton, Ohio Application May 31, 1947, Serial No. 751,526

4 Claims. (Cl. 64—32)

This invention relates to a flexible cover for a universal joint, and is an improvement on the cover shown and described in my copending application Serial Number 569,459, filed December 23, 1944 now Patent No. 2,534,635.

A universal joint is provided with a cover primarily for the purpose of excluding dust or other foreign matter from the pivot bearings and for providing a sealed container for a lubricant, but when the cover is maintained in compression or under tension it also serves to retain the pivot pins in firm contact with their bearings and to thus minimize the relative movements of the pins and the bearings and materially reduce the wear on the bearings due to vibration and the like. Such a cover is usually tubular in form and is firmly anchored at its ends to the respective coupling members and sealed to prevent leakage of the lubricant. When such a cover is in longitudinal compression one or more circumferential portions thereof will be buckled or projected outwardly, thereby permitting the relative movement of the coupling members with relation one to the other about their pivotal axes without subjecting the cover to tension.

The cover of the aforesaid application comprises a tubular structure which extends about the pivotal connections between the two coupling members of the universal joint, and the end portions of the cover are rigidly secured to the respective coupling members, in sealed contact therewith, and in such a manner as to longitudinally compress the cover and cause the same to buckle or bulge outwardly. For the purpose of controlling the location of the buckled portions of the cover and the direction in which they buckle, the tubular structure is provided adjacent each end thereof with a single internal circumferential groove. In attaching the cover to the tubular members it is longitudinally compressed and the grooved circumferential portions thereof are caused to buckle outwardly. It frequently happens that one end portion of the cover will be buckled to a greater extent than the other end portion thereof and sometimes the one end portion will buckle to such an extent as to substantially prevent the buckling of the other end portion. The cover is thus objectionably distorted and its changed relation to the pivotal connections of the coupling members may produce undesirable results, such as subjecting a portion of the cover to abrasion by the jaws and materially increasing the diameter of a portion of the cover.

One object of the present invention is to produce such a cover which will not be under material tension in any operative position of the coupling members.

A further object of the invention is to provide such a cover which will be substantially free from abrasion by the jaws of the coupling members in all operative positions of the latter.

A further object of the invention is to provide such a cover which is of relatively small overall diameter and which may be installed in locations where the available space is small.

A further object of the invention is to provide a cover both end portions of which, when longitudinally compressed, will buckle outwardly to substantially the same extent.

A further object of the invention is to provide such a cover which is of a simple construction and which can be easily manufactured.

Other objects of the invention may appear as the cover is described in detail.

Figure 2:
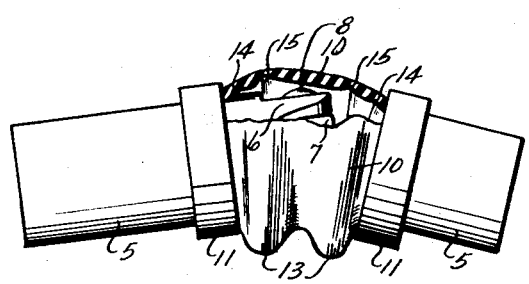
Figure 3:
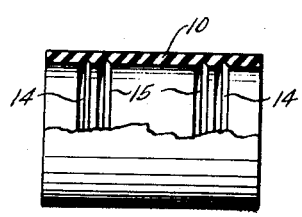
Figure 4:
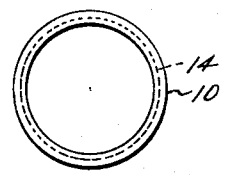

In the accompanying drawings Fig. 1 is a longitudinal section through a portion of a universal joint, showing the cover applied thereto with the coupling members in alinement; Fig. 2 is a side elevation of the cover of Fig. 1 with the coupling members in angular relation one to the other and with the cover partly in section; Fig. 3 is a sectional view of a cover embodying the invention, partly in elevation; and Fig. 4 is an end view of the cover.

In these drawings I have illustrated one embodiment of the invention and have shown the same as applied to a universal joint of a well known construction but it is to be understood that the invention may take various forms and may be applied to universal joints of various kinds without departing from the spirit of the invention.

The universal joint to which the cover is here applied comprises two coupling members 5 arranged end to end, each coupling member being provided at one end with a pair of jaws 6, the pairs of jaws being arranged in intersecting planes. A pivot block 7 is interposed between the jaws of both pairs and is connected therewith by pivot pins 8. Each coupling member is provided adjacent the roots of its jaws with a circumferential groove 9.

In the form here shown the cover comprises a tubular structure 10 of elastic material, such as a suitable synthetic rubber, and is initially cylindrical in form. The cover is initially of a length greater than the distance between the grooves 9 of the coupling members 5 and when placed on the joint about the pivotal connections thereof, it overlies both said grooves. It may or may not extend beyond the outer walls of the grooves. The end portions of the cover are secured to the respective coupling members by circumferential bands 11 which are placed about the respective end portions of the cover and then radially compressed to press parts of the end portions into the respective grooves, thereby both anchoring and sealing the cover. The compression of the bands forces portions of the rubber from beneath the bands into the adjacent portions of the cover, thereby slightly increasing the length of the cover between the bands. Preferably each band 11 is provided at its outer end with a radial flange 12 adapted to enter the corresponding recess 9 and to thus lock both the band and the end of the cover against movement lengthwise of the joint. In applying the cover to the joint it is placed about the latter, in its initial cylindrical condition, and one end thereof is anchored to the corresponding coupling member in the manner above described, by one of the bands 11. The other band 11 is then placed about the corresponding end of the cover with its flange 12 in contact with the end edge of the cover and is subjected to axial pressure to move the flange into line with the recess 9 and thus longitudinally compress the cover and is then compressed radially to anchor that end of the cover to the corresponding coupling member.

The longitudinal compression of the cover causes circumferential portions thereof to buckle or bulge outwardly as shown at 13. It is important that these portions of the cover shall bulge outwardly, and not inwardly, and that they shall be located adjacent respective ends of the cover and shall buckle to the same extent, so that when the coupling members are in alinement the cover takes the form shown in Fig. 1. For the purpose of so controlling the buckling of the cover the cylindrical body is provided adjacent each end thereof with a plurality of internal circumferential grooves, preferably two, as shown at 14 and 15. The grooves of each pair are relatively narrow and are arranged close one to the other. The space between each pair of adjacent grooves is substantially equal to the width of the grooves. This space forms a stiffening portion to localize and control the buckling thereof and may be referred to as a reinforcing rib, restricting bulging, so that the bulges formed in association with the two pairs of grooves are similar. The grooves are shallow in depth. The depth of each groove is substantially equal to one-half the width of each groove, as clearly shown in Figure 3. The distance between the grooves of each adjacent pair is substantially equal to twice the depth of each groove. Each pair of the grooves serves to weaken the cover along circumferential lines and the thick and relatively stiff portion of the cover between the grooves of each pair causes the cover to yield to the same extent on each weakened line and the portion between the grooves moves outwardly, so that the buckled portion has substantially the form shown in Fig. 1. Each pair of grooves is spaced inwardly from the adjacent end of the cover a distance sufficient to permit the cover to overlap the corresponding coupling member and to be anchored thereto. The two pairs of grooves are spaced longitudinally one from the other a substantial distance and due to the weakening of the cover along the two pairs of parallel lines the cover when subjected to longitudinal pressure will buckle outwardly to substantially the same extent adjacent each end of the cover. The cover bends about the inner edges of the attaching bands 11 close to the outer groove 14 of each pair and when the coupling members are substantially in alinement the side walls of the grooves of both pairs are pressed one toward the other so that each groove is partially closed, and that portion of the cover which is between the two pairs of grooves will be slightly curved inwardly. When in this condition the cover has no contact with the pivotal connections between the coupling members, the overall diameter of the cover has not been materially increased at any point and the tendency of the cover to expand retains the pivot bearings in firm contact with the pivot pins.

When the coupling members assume an angular relation one to the other one side of the cover is further compressed and the opposite side thereof is longitudinally extended by the expansion thereof without offering resistance to the pivotal movement of the coupling members and without subjecting the cover to tension. Even when the coupling members are at their maximum angularity no part of the cover is under appreciable tension. The pivotal movement of the coupling members moves a portion of the extended side of the cover toward the adjacent jaw and at extreme angularity of the coupling members the cover may contact the jaw but the contact is so light that no material abrasion of the cover results therefrom.

While I have shown and described one embodiment of my invention, I wish it to be understood that I do not desire to be limited to the details thereof as various modifications may occur to a person skilled in the art.

Having now fully described my invention what I claim as new and desire to secure by Letters Patent, is:

1. In a universal joint, two coupling members connected one with the other for relative movement about intersecting axes, a cover comprising a longitudinally compressible tubular structure of flexible material supported on said coupling members in longitudinal compression, and attaching devices extending about the respective end portions of said tubular structure connecting said end portions with said coupling members and retaining said structure in said longitudinal compression, said structure being weakened along two groups of circumferential narrow grooves adjacent the inner ends of the respective attaching devices, the depth of each groove being substantially equal to one-half the width of each groove, the distance between the grooves of each pair being substantially equal to the width of each groove, and the two groups of grooves being spaced substantial distances one from the other by an unweakened portion of said structure, said weakened portions of said structure being deflected outwardly by said longitudinal compression of said structure.

2. In a universal joint, two coupling members connected one with the other for relative movement about intersecting axes, a cover comprising a longitudinally compressible tubular structure of flexible material supported on said coupling members in longitudinal compression, and attaching devices extending about the respective end portions of said tubular structure connecting said end portions with said coupling members and retaining said structure in said longitudinal compression, said structure having adjacent each end thereof a pair of internal circumferential narrow grooves, the grooves of each pair being spaced apart a distance substantially equal to the width of a groove, the portion between each pair of grooves forming a stiffening portion of said structure to localize and control the buckling thereof, the outermost groove of each group of grooves being in narrowly spaced relation to the inner end of the adjacent attaching device, and the innermost grooves of the two groups being spaced one from the other a substantial distance by an unweakened portion of said structure, and said grooved portions of said structure being deflected outwardly by said longitudinal compression of said structure.

3. In a universal joint, two coupling members connected one with the other for relative movement about intersecting axes, each coupling member having a circumferential groove spaced from the pivotal axis thereof, a cover comprising a longitudinally compressible tubular structure of flexible material having end portions extending about the grooved portions of the respective coupling members, said tubular structure being of an initial length greater than the distance between said grooves, said tubular structure having adjacent the respective ends thereof two pairs of internal circumferential narrow grooves, the grooves of each pair being spaced one from the other by a narrow portion of said structure, the distance between the grooves being substantially equal to the width of a groove and substantially equal to twice the depth of a groove, and the two pairs of grooves being spaced a substantial distance one from the other, and attaching devices extending about said end portions of said structure and rigidly securing the same in the grooves of the respective coupling members with said structure in a longitudinally compressed condition, whereby the grooved circumferential portions of said structure are buckled outwardly substantially equal distances.

4. In a universal joint, two coupling members connected one with the other for relative movement about intersecting axes, a cover comprising a longitudinally compressible tubular structure of flexible material supported on said coupling members in longitudinal compression, and attaching devices extending about the respective end portions of said tubular structure connecting said end portions with said coupling members and retaining said structure in said longitudinal compression, said structure having adjacent each end thereof a pair of internal circumferential narrow grooves, the grooves of each pair being spaced a short distance apart so that the grooves of each pair are located on opposite sides of a reinforcing rib portion, the outermost groove of each group of grooves being in narrowly spaced relation to the inner end of the adjacent attaching device, and the innermost grooves of the two groups being spaced one from the other a substantial distance by an unweakened portion of said structure, said grooves of each pair of grooves together with said reinforcing rib portion being weaker than the portions of the cover on either side of the grooves, the reinforcing rib portion between the grooves restraining outward movement so that as the tubular structure is compressed the grooves together with the rib portions associated with one pair of grooves expand substantially equal with the grooves and the rib portion associated with the other pair of grooves.

GEORGE B. STILLWAGON, Jr.

References Cited in the file of this patent

UNITED STATES PATENTS

| Number | Name | Date |
| --- | --- | --- |
| 1,352,019 | Murphy | Sept. 7, 1920 |
| 1,558,503 | Pressler | Oct. 27, 1925 |
| 2,264,728 | Stillwagon, Jr. et al. | Dec. 2, 1941 |
| 2,534,635 | Stillwagon, Jr. | Dec. 19, 1950 |

FOREIGN PATENTS

| Number | Country | Date |
| --- | --- | --- |
| 325,019 | Germany | 1920 |